(12) United States Patent
Tajima

(10) Patent No.: US 8,941,745 B2
(45) Date of Patent: Jan. 27, 2015

(54) MOBILE COMMUNICATION APPARATUS FOR CONTROLLING IMAGING BASED ON FACIAL RECOGNITION

(75) Inventor: Yasuhiro Tajima, Tokyo (JP)

(73) Assignee: Lenovo Innovations Limited (Hong Kong), Quarry Bay (HK)

( * ) Notice: Subject to any disclaimer, the term of this patent is extended or adjusted under 35 U.S.C. 154(b) by 137 days.

(21) Appl. No.: 13/505,610

(22) PCT Filed: Oct. 22, 2010

(86) PCT No.: PCT/JP2010/068666
§ 371 (c)(1),
(2), (4) Date: May 2, 2012

(87) PCT Pub. No.: WO2011/052492
PCT Pub. Date: May 5, 2011

(65) Prior Publication Data
US 2012/0224074 A1 Sep. 6, 2012

(30) Foreign Application Priority Data
Nov. 2, 2009 (JP) .................................. 2009-252155

(51) Int. Cl.
*H04N 5/228* (2006.01)
*H04N 5/232* (2006.01)
(Continued)

(52) U.S. Cl.
CPC ............ *G06F 3/005* (2013.01); *H04N 5/23248* (2013.01); *G06F 3/017* (2013.01);
(Continued)

(58) Field of Classification Search
USPC ................. 348/207.11, 211.99, 211.3, 211.4, 348/211.8, 211.11, 211.13
See application file for complete search history.

(56) References Cited

U.S. PATENT DOCUMENTS 7,440,013 B2 * 10/2008 Funakura ...................... 348/239
7,583,316 B2   9/2009 Miyashita et al.
(Continued)

FOREIGN PATENT DOCUMENTS

CN   1708979    12/2005
JP   5-040303   2/1993
(Continued)

OTHER PUBLICATIONS

International Search Report, PCT/JP2010/068666, Nov. 16, 2010.
(Continued)

*Primary Examiner* — Joel Fosselman
(74) *Attorney, Agent, or Firm* — Young & Thompson

(57) ABSTRACT

A mobile communication apparatus comprises: a first camera unit for capturing an image of a subject; a second camera unit for capturing an image of the camera operator or an image of an object possessed by the camera operator; an activation control unit; an operation recognizing unit; and an image capture control unit. The activation control unit controls, in response to an activation instruction, the second camera unit to start an image capture operation and sequentially generate still-image data. The operation recognizing unit compares, in response to an instruction to start the image capture operation, still-image data, specifically, current still-image data and the previous still-image data. If the current still-image data have varied relative to the previous still-image data, the image capture control unit controls the first camera unit to capture an image of the subject to generate image capture data. In this way, the mobile communication apparatus can prevent any blur from occurring when the camera function is used to capture an image of a subject.

20 Claims, 3 Drawing Sheets

(51) Int. Cl.
  *G06K 9/00* (2006.01)
  *G06F 3/00* (2006.01)
  *G06F 3/01* (2006.01)
  *H04N 21/422* (2011.01)
  *H04N 21/4223* (2011.01)

(52) U.S. Cl.
  CPC ....... *H04N5/23219* (2013.01); *H04N 5/23229* (2013.01); *H04N 21/42201* (2013.01); *H04N 21/42222* (2013.01); *H04N 21/4223* (2013.01)
  USPC .................. 348/208.6; 348/211.4; 348/211.8; 382/118

(56) References Cited

U.S. PATENT DOCUMENTS

| | | | |
|---|---|---|---|
| 8,077,215 | B2 | 12/2011 | Nakamura |
| 8,165,399 | B2 | 4/2012 | Kaneda et al. |
| 8,494,233 | B2 | 7/2013 | Kaneda et al. |
| 2005/0036044 | A1 | 2/2005 | Fukakura |
| 2005/0099500 | A1 | 5/2005 | Fujita |
| 2006/0044396 | A1 | 3/2006 | Miyashita et al. |
| 2008/0212831 | A1* | 9/2008 | Hope ............................ 382/103 |
| 2008/0220829 | A1* | 9/2008 | Akama et al. .................. 455/574 |
| 2008/0273765 | A1* | 11/2008 | Tsujimura .................... 382/118 |
| 2010/0157099 | A1 | 6/2010 | Nakai |

FOREIGN PATENT DOCUMENTS

| | | | |
|---|---|---|---|
| JP | 11-101935 | | 4/1999 |
| JP | 2000-196934 | | 7/2000 |
| JP | 2000196934 | * | 7/2000 |
| JP | 2003-274376 | | 9/2003 |
| JP | 2004-147046 | | 5/2004 |
| JP | 2005-092419 | | 4/2005 |
| JP | 2005-094741 | | 4/2005 |
| JP | 2005-250396 | | 9/2005 |
| JP | 2006-279116 | | 10/2006 |
| JP | 2008-032828 | | 2/2008 |
| JP | 2008-186303 | | 8/2008 |
| JP | 2008-227672 | | 9/2008 |
| JP | 2008-262447 | | 10/2008 |
| JP | 2010-148052 | | 7/2010 |
| WO | 2009-057344 | | 5/2009 |

OTHER PUBLICATIONS

Chinese Official Action—201080049454.8—Apr. 1, 2014.
Extented European Search Report—EP 10 82 6624—Apr. 8, 2014.
Japanese Official Action—2011-538391—May 21, 2014.

* cited by examiner

MOBILE COMMUNICATION APPARATUS FOR CONTROLLING IMAGING BASED ON FACIAL RECOGNITION

TECHNICAL FIELD

The present invention is related to a mobile communication apparatus provided with a camera function.

BACKGROUND ART

For example, as a mobile communication apparatus, a mobile phone terminal is in widespread use. In recent years, the miniaturization and lightening of the mobile phone terminal are developed. Also, a type of mobile phone terminal provided with a camera (a camera function) is increasing.

However, because the mobile phone terminal is not camera exclusive use, the stability is not often good as compared with a usual camera, when imaging a subject by the camera function. For example, in the mobile phone terminal, a shutter button (imaging button) is pushed when a photographer images a subject by use of the camera function. At this time, the mobile phone terminal sometimes shifts from a desired position due to a pushing manner or technique of the photographer (the position shifts due to hand movement) when the shutter button is pushed.

It is considered that a remote control device is used on imaging to prevent the shift of the mobile phone terminal. However, the photographer must carry the remote control device separately from the mobile phone terminal. Thus, a problem exists in the profit convenience point. Also, it is considered that the mobile phone terminal recognizes a speech of the photographer as a trigger. However, there is a problem in the imaging in the place where the speech is not permitted.

The techniques of the mobile communication apparatus are introduced.

A mobile terminal is described in JP 2008-227672A in which a power saving condition of a display can be canceled even if any key is not touched.

A mobile terminal with a camera is described in JP 2005-250396A in which a parallax control and a focus control in a pair of imaging sections are performed and a stereograph image can be generated.

A mobile communication apparatus is described in JP 2003-274376A in which one camera is used while another camera is used for the TV telephone.

CITATION LIST

[Patent Literature 1] JP 2008-227672A
[Patent Literature 2] JP 2005-250396A
[Patent Literature 3] JP 2003-274376A

SUMMARY OF THE INVENTION

An object of the present invention is to provide a mobile communication apparatus which can stabilize the imaging when imaging a subject by a camera function.

The mobile communication apparatus of the present invention is provided with a first camera section to image a subject; a second camera section to image a photographer or a personal thing; a start control section; an operation recognizing section, an imaging control section. The start control section controls the second camera section to start the imaging and to generate still image data in order, in response to a start instruction. The operation recognizing section compares the current still image data and previous still image data, which are still image data, in response to an imaging start instruction. The imaging control section controls the first camera section to image the subject and to generate imaged data, when the current still image data is changed from the previous still image data.

In the mobile communication apparatus of the present invention, a change between the images imaged by the second camera section is used as a trigger when imaging the subject by the camera function (the first camera section). Thus, because the imaging can be carried out in the condition that the mobile communication apparatus is put, the image stabilization can be attained.

BRIEF DESCRIPTION OF THE DRAWINGS

The objects, effects, and features of the present invention would become clearer from the description of the exemplary embodiments in conjunction with the attached drawings.

DESCRIPTION OF EXEMPLARY EMBODIMENTS

Hereinafter, a mobile communication apparatus according to exemplary embodiments of the present invention will be described in detail with reference to the attached drawings.

First Exemplary Embodiment

As the mobile communication apparatus according to a first exemplary embodiment of the present invention, a mobile phone terminal, a PHS (Personal Handyphone System), a PDA (Personal Digital Assistants) and so on are exemplified. Hereinafter, a mobile phone terminal will be described, using it as an example.

Figure 1:
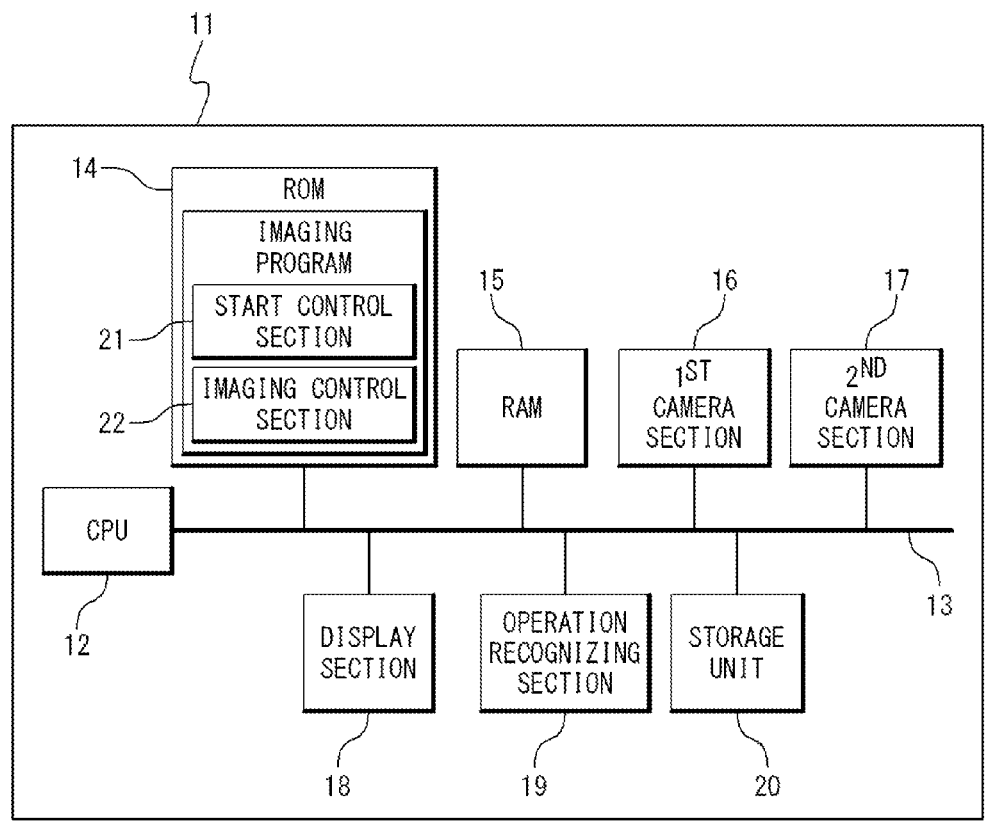
FIG. 1 is a block diagram showing a configuration of a mobile phone terminal 11 as a mobile communication apparatus according to a first to third exemplary embodiments of the present invention.

FIG. 1 shows a configuration of the mobile phone terminal 11 according to the first exemplary embodiment of the present invention.

The mobile phone terminal 11 according to the first exemplary embodiment of the present invention is provided with a CPU (Central Processing Unit) 12, a bus 13, a ROM (Read Only Memory) 14, a RAM (Random Access Memory) 15, a first camera section 16, a second camera section 17, a display section 18, an operation recognizing section 19, and the storage unit 20.

The CPU 12 is connected with the ROM 14, the RAM 15, the first camera section 16, the second camera section 17, the display section 18, the operation recognizing section 19, and the storage unit 20 through the bus 13.

Control programs as various computer programs to be executed by the CPU 12 and fixed data used in the mobile phone terminal 11 are stored in the ROM 14.

Data which is temporarily required when the CPU 12 executes the programs is stored in the RAM 15.

The first camera section 16 is used to image a subject.

The second camera section 17 is used to image a photographer or its personal thing.

The display section 18 displays to an operator, data such as the execution result of the CPU (e.g. operation menu) and images imaged by the first camera section 16 and the second camera section 17.

The operation recognizing section 19 receives an image imaged by the second camera section 17 and detects an operation change from the image.

The storage unit 20 stores the image imaged by the first camera section 16.

The control programs stored in the ROM 14 contain a camera imaging program. This camera imaging program contains a start control section 21 and an imaging control section 22. Here, the operation recognizing section 19 may be realized by a circuit (device) or a computer program (the camera imaging program).

Figure 2A:
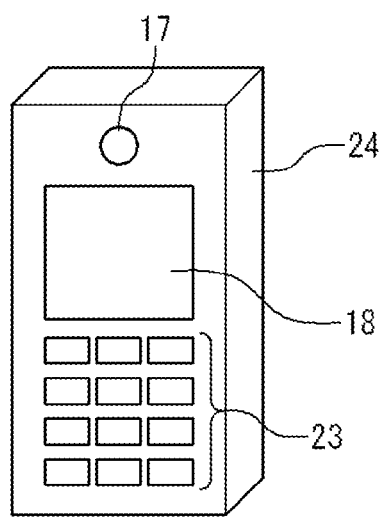
FIG. 2A is a front perspective view showing the mobile phone terminal 11.
Figure 2B:
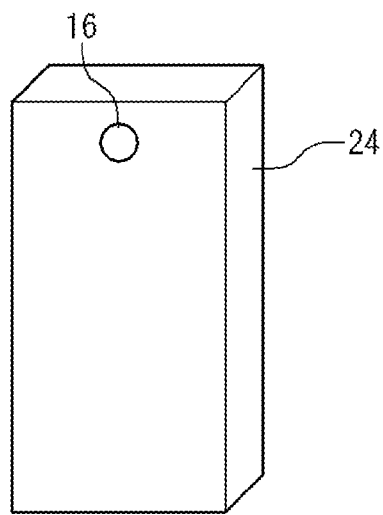
FIG. 2B is a back perspective view showing mobile phone terminal 11.

FIG. 2A is a front perspective view of the mobile phone terminal 11 and FIG. 2B is a back perspective view of the mobile phone terminal 11.

Moreover, the mobile phone terminal 11 is provided with an input section 23 operated by a user (photographer) and a housing 24. The second camera section 17, the display section 18, and the input section 23 are provided on the front side of the housing 24. The first camera section 16 is provided for the back side of the housing 24. The CPU 12, the bus 13, the ROM 14, the RAM 15, the operation recognizing section 19, and the storage unit 20 are provided in the housing 24.

Figure 3:
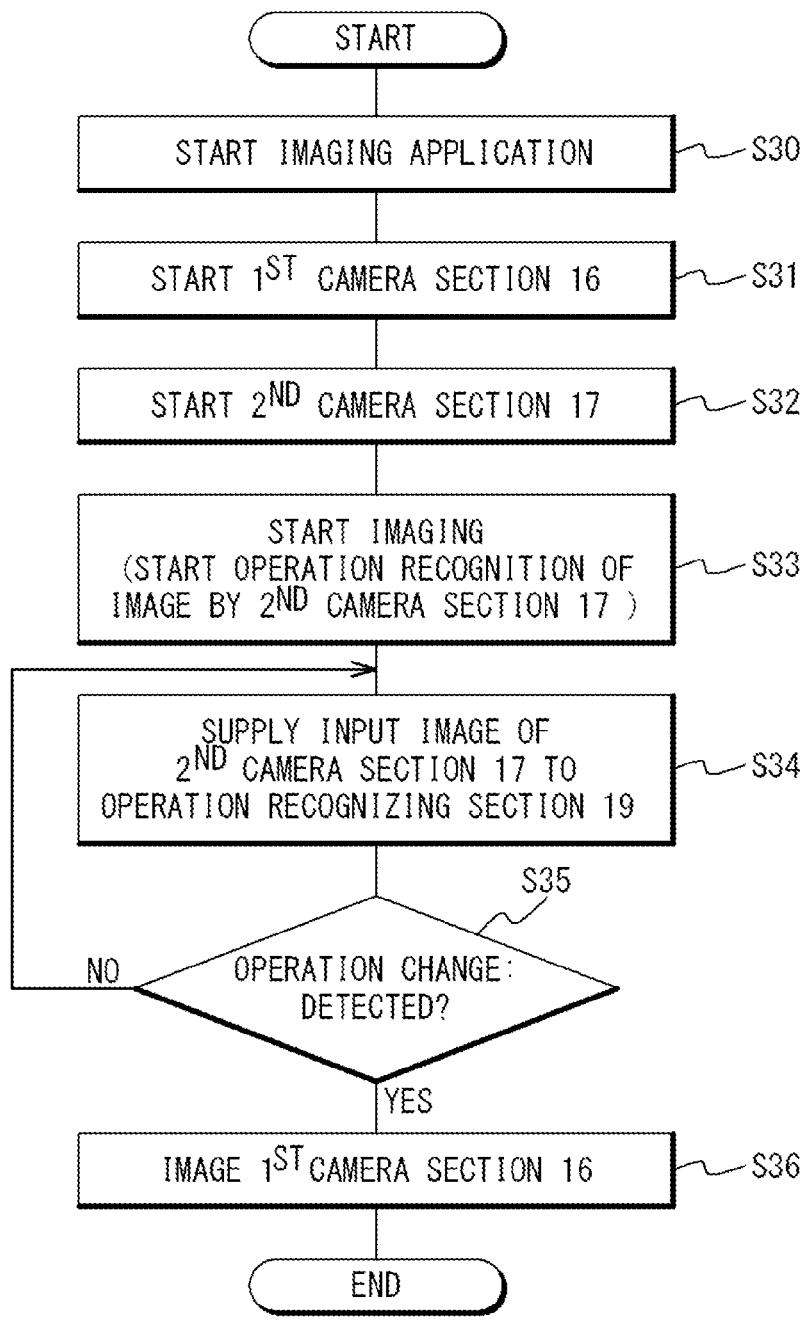
FIG. 3 is a flow chart showing the operation of the mobile phone terminal 11.

FIG. 3 is a flow chart showing the operation of the mobile phone terminal 11.

The photographer turns the first camera section 16 (the front side of the mobile phone terminal 11) to the subject. At this time, the photographer operates the input section 23 to give a start instruction to the mobile phone terminal 11 to start the camera imaging program (the camera imaging application) (Step S30).

The start control section 21 starts the first camera section 16 in response to the start instruction. At this time, the start control section 21 starts the imaging, controls the first camera section 16 to generate preview video image data as video image data showing the subject, and displays the preview image data on a first display area of the display section 18 (Step S31).

Also, the start control section 21 starts the second camera section 17 in response to the start instruction. At this time, the start control section 21 start the imaging, controls the second camera section 17 to generate still image data in order, and displays the still image data on a second display area of the display section 18 in order (Step S32).

At the step S32, the first and second display areas of the display section 18 are square, and the second display area is smaller than the first display area. For example, the second display area is provided for a corner of the first display area with a small frame, and the still image data is displayed so as not to hinder the preview video image data.

The photographer operates the input section 23 to give an imaging start instruction to the mobile phone terminal 11 while the camera imaging application is executed (Step S33).

At this time, the operation recognizing section 19 sequentially receives the still image data generated by the second camera section 17 in response to the imaging start instruction (Step S34).

The operation recognizing section 19 compares the current still image data and the previous still image data and determines whether or not current still image data of the received still image data is changed from previous still image data thereof (Step S35).

At the step S35, as a determination method of the change, for example, the operation recognizing section 19 calculates a differential brightness value showing a difference between the brightness value of an image of the current still image data and the brightness value of an image of the previous still image data in response to the imaging start instruction, and compares the calculated differential brightness value and a setting brightness value.

When the calculated differential brightness value does not exceed the setting brightness value (Step S35—NO), the operation recognizing section 19 determines that the current still image data is not changed from the previous still image data. Thus, a step S34 is executed.

On the other hand, when the calculated differential brightness value exceeds the setting brightness value (Step S35—YES), the operation recognizing section 19 determines that the current still image data is changed from the previous still image data and outputs an operation detection signal.

At the step S35—YES, for example, through an operation that the photographer crosses his own finger or the photographer's thing in front of the second camera 17, the operation recognizing section 19 determines that the current still image data is changed from the previous still image data. In this case, an image of the photographer or the photographer's thing is displayed in an image showing one of the current still image data and the previous still image data, and the image of the photographer or the photographer's thing is not displayed in an still showing the other of the current still image data and the previous still image data.

The imaging control section 22 controls the first camera section 16 to image the subject in response to the operation detection signal and stores the imaged data in the storage unit 20 (Step S36).

In the mobile phone terminal 11 according to the first exemplary embodiment of the present invention, the change of the image imaged by the second camera section 17 is used a trigger for the imaging, when the subject is imaged by a camera function (the first camera section 16). Thus, because the photographer can image the subject in a condition that the mobile phone terminal 11 is put and fixed, the imaging can be carried out in a stabilized condition.

Also, in the mobile phone terminal 11 according to the first exemplary embodiment of the present invention, because the image imaged by the second camera section 17 is displayed in the corner (the second display area) of the display section 18, it is easy for the photographer to determine the imaging timing.

Second Exemplary Embodiment

In the mobile phone terminal 11 according to the first exemplary embodiment of the present invention, when comparing the current still image data and the previous still image data, the operation recognizing section 19 calculates the differential brightness value showing a difference in the brightness value, and compares the calculated differential brightness value and the setting brightness value. However, the present invention is not limited to this. In the mobile phone terminal 11 according to a second exemplary embodiment of the present invention, when comparing the current still image data and the previous still image data, a change value showing the number of pixels or an area, which is changed, is calculated, and the change value and the setting value are compared. In the second exemplary embodiment, the explanation of a portion which overlaps the first exemplary embodiment is omitted.

First, the steps S30 to S34 are executed.

At the step S35, as the determination method of the change, for example, the operation recognizing section 19 calculates the change value indicating the number of pixels or an area of a change portion of the image shown by the current still image data from the image shown by the previous still image data in response to the imaging start instruction and compares the change value and a setting value.

Here, when the change value does not exceed the setting value (Step S35—NO), the operation recognizing section 19 determines that the current still image data is not changed from the previous still image data, and the control flow advances to step S34.

On the other hand, when the change value exceeds the setting value (Step S35—YES), the operation recognizing section 19 determines that the current still image data is changed from the previous still image data about, and outputs an operation detection signal. After that, the control flow advances to step S36.

In the mobile phone terminal 11 according to the second exemplary embodiment of the present invention, the same effect as the first exemplary embodiment is achieved.

Third Exemplary Embodiment

In the mobile phone terminal 11 according to the second exemplary embodiment of the present invention, when the photographer moves his own finger or the photographer's thing to cross the view of the second camera 17, the operation recognizing section 19 determines that the current still image data is changed from the previous still image data. However, the present invention is not limited to this. In the mobile phone terminal 11 according to a third exemplary embodiment of the present invention, when the photographer changes its expression in front of the second camera 17, the operation recognizing section 19 may determine that the current still image data is changed from the previous still image data through the facial recognition. The same description as those of the first and second exemplary embodiments is omitted in the description of the third exemplary embodiment.

First, the steps S30 to S34 are executed.

At the step S35, as the determination method of the change, for example, the operation recognizing section 19 calculates the change value indicating the number of pixels or the area of the change portion of the image shown by the current still image data from the image shown by the previous still image data in response to the imaging start instruction and compares the change value and the setting value. In this case, the face of the photographer is imaged as the current still image data and the previous still image data, and the change portion of the image shown by the current still image data from the image shown by the previous still image data is the look of the face.

For example, the setting value is set so that the change value does not exceed the setting value through the facial recognition, when the photographer looks serious. Also, the setting value is set so that the change value exceeds the setting value through the facial recognition when the photographer winks or keeps a smile.

Thus, when the change value does not exceed the setting value (Step S35—NO), the operation recognizing section 19 determines that the current still image data is not changed from the previous still image data about. The control flow advances to step S34.

On the other hand, when the change value exceeds the setting value (Step S35—YES), the operation recognizing section 19 determines that the current still image data is changed from the previous still image data and outputs an operation detection signal. After that, the step S36 is executed.

In the mobile phone terminal 11 according to the third exemplary embodiment of the present invention, when a subject is imaged by the camera function (the first camera section 16), the change between the images imaged by the second camera section 17 is used as a trigger through the facial recognition. Thus, it becomes possible for the photographer to fix the mobile phone terminal 11 with both hands and to image in the more natural posture.

The present invention has been described with reference to the above exemplary embodiments, but the present invention is not limited to the above exemplary embodiments. Various modifications to the configuration and the details by the photographer skilled in the art are contained in the scope of the present invention.

This application claims a priority based on Japanese Patent Application No. JP 2009-252155 filed on Nov. 2, 2009. The disclosure thereof is incorporated herein by reference.

The invention claimed is:

1. A mobile communication apparatus comprising:
   a first camera section configured to obtain an image of a subject;
   a second camera section configured to obtain an image of a photographer;
   a start control section configured to control said second camera section to start obtaining the image of the photographer in response to a start instruction and to generate still image data in order;
   an operation recognizing section configured to compare current still image data of a face of the photographer and previous still image data of the face of the photographer through facial recognition as the still image data in response to an image-obtaining start instruction, to calculate a change value of a change portion between the current still image data and the previous still image data, and to compare the change value with a setting value set based on a positive feature indication through facial recognition to determine whether the change value exceeds the setting value; and
   an imaging control section configured to control said first camera section to obtain the image of the subject and to generate image data when the change value is determined to exceed the setting value.

2. The mobile communication apparatus according to claim 1, wherein the change value is determined by the operation recognizing section calculating a differential brightness value showing a difference between a brightness value of an image of the current still image data and a brightness value of an image of the previous still image data in response to the imaging start instruction, and the operation recognizing section compares the calculated differential brightness value and the setting value, the setting value being a setting brightness value, and
   wherein said imaging control section controls said first camera section to obtain the image of the subject and to generate the image data, when the calculated differential brightness value exceeds the setting brightness value.

3. The mobile communication apparatus according to claim 2, wherein the image of the photographer is obtained from one of the current still image data and the previous still image data, and
   wherein the image of the photographer is not obtained from the image of the other still image data.

4. The mobile communication apparatus according to claim 2, further comprising a display section,
   wherein in response to the start instruction, said start control section controls said first camera section to start obtaining the image of the subject and to generate preview image data as the imaged data showing the image of the subject, displays the preview image data on a first display area of said display section, controls said second camera section to start obtaining the image of the photographer and to generate the still image data in order, and displays the still image data in a second display area on said display section in order.

5. The mobile communication apparatus according to claim 1, wherein the change value indicates the number of pixels or an area of the change portion of an image of the current still image data from an image of the previous still image data in response to the imaging start instruction.

6. The mobile communication apparatus according to claim 5,
wherein the change portion between the image of the current still image data and the image of the previous still image data is a look of the face.

7. The mobile communication apparatus according to claim 5, wherein the image of the photographer is obtained from one of the current still image data and the previous still image data, and the image of the photographer is not obtained from the other still image data.

8. The mobile communication apparatus according to claim 5, further comprising a display section,
wherein in response to the start instruction, said start control section controls said first camera section to start obtaining the image of the subject and to generate preview image data as the imaged data showing the image of the subject, displays the preview image data on a first display area of said display section, controls said second camera section to start obtaining the image of the photographer and to generate the still image data in order, and displays the still image data in a second display area on said display section in order.

9. The mobile communication apparatus according to claim 1, further comprising a display section,
wherein in response to the start instruction, said start control section controls said first camera section to start obtaining the image of the subject and to generate preview image data as the imaged data showing the image of the subject, displays the preview image data on a first display area of said display section, controls said second camera section to start obtaining the image of the photographer and to generate the still image data in order, and displays the still image data in a second display area on said display section in order.

10. The mobile communication apparatus according to the claim 9, wherein the second display area is smaller than the first display area.

11. The mobile communication apparatus according to claim 1, wherein the positive feature indication is one of a wink of an eye of the photographer or maintenance of a smile of the photographer.

12. An image production method executed by a mobile communication apparatus which includes a first camera section configured to obtain an image of a subject and a second camera section configured to obtain an image of a photographer, said imaging method comprising:
controlling said second camera section to start obtaining the image of the photographer in response to a start instruction and to generate still image data in order;
comparing current still image data of a face of the photographer and previous still image data of the face of the photographer through facial recognition which are the still image data in response to an image-obtaining start instruction, calculating a change value of a change portion between the current still image data and the previous still image data, and comparing the change value with a setting value to determine whether the change value exceeds the setting value; and
controlling said first camera section to obtain the image of the subject and to generate the image data when the change value is determined to exceed the setting value, the change value being determined to exceed the setting value when there is a positive feature indication on the face of the photographer indicated by the compared still image data through facial recognition.

13. The image production method according to claim 12, wherein the change value is determined by calculating a differential brightness value indicating a difference between a brightness value of an image of the current still image data and a brightness value of an image of the previous still image data in response to the image-obtaining start instruction,
the calculated differential brightness value and a setting value are compared, the setting value being a setting brightness value, and
wherein said controlling said first camera section comprises controlling said first camera section to obtain the image of the subject and to generate the image data, when the calculated brightness value exceeds the setting brightness value.

14. The image production method according to claim 13, wherein the image of the photographer has been obtained the current still image data and the previous still image data, and the image of the photographer has not obtained from the other still image data.

15. The image production method according to claim 12, wherein the calculated change value indicates the number of pixels or an area of the change portion of an image of the current still image data from an image of the previous still image data in response to the image-obtaining start instruction.

16. The image production method according to claim 15,
wherein the change portion between an image of the current still image data and an image of the previous still image data is a look of the face.

17. The image production method according to claim 12, wherein said mobile communication apparatus further comprises a display section,
wherein said controlling said second camera section comprises:
starting obtaining the image of the photographer in response to the start instruction, controlling said first camera section to generate preview image data as video image data showing the image of the subject;
displaying the preview image data on a first display area of said display section;
controlling said second camera section to start obtaining the image of the subject and to generate said still image data in order; and
displaying the still image data on a second display area of said display section in order.

18. The image production method according to claim 17, wherein the second display area is smaller than the first display area.

19. The image production method according to claim 12, wherein said mobile communication apparatus further comprises a storage unit, and
wherein said image production method further comprises: storing the image data in said storage unit.

20. A non-transitory computer-readable recording medium in which a computer-executable program is stored to attain an image production method executed by a mobile communication apparatus which comprises a first camera section configured to obtain an image of a subject and a second camera section configured to obtain an image of a photographer, wherein said imaging method comprises:

controlling said second camera section to start obtaining the image of the photographer in response to a start instruction and to generate still image data in order;

comparing current still image data of a face of the photographer and previous still image data of the face of the photographer through facial recognition which are the still image data in response to an image-obtaining start instruction, calculating a change value of a change portion between the current still image data and the previous still image data, and comparing the change value with a setting value to determine whether the change value exceeds the setting value; and controlling said first camera section to obtain the image of the subject and to generate the image data when the change value is determined to exceed the setting value, the change value being determined to exceed the setting value when there is a positive feature indication on the face of the photographer indicated by the compared still image data through facial recognition.

* * * * *